Aug. 24, 1954
R. T. HALL
2,687,454
ELECTRICAL CHECKING DEVICE
Filed June 19, 1950
2 Sheets-Sheet 2
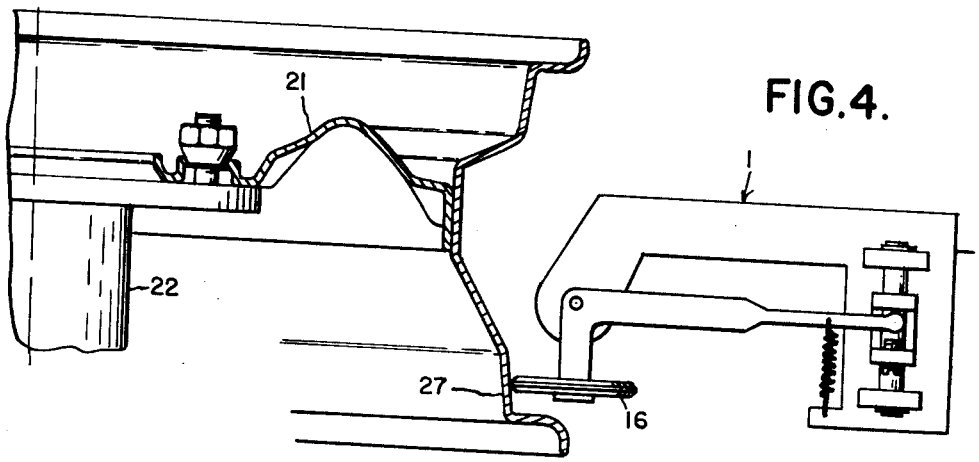
FIG. 4.
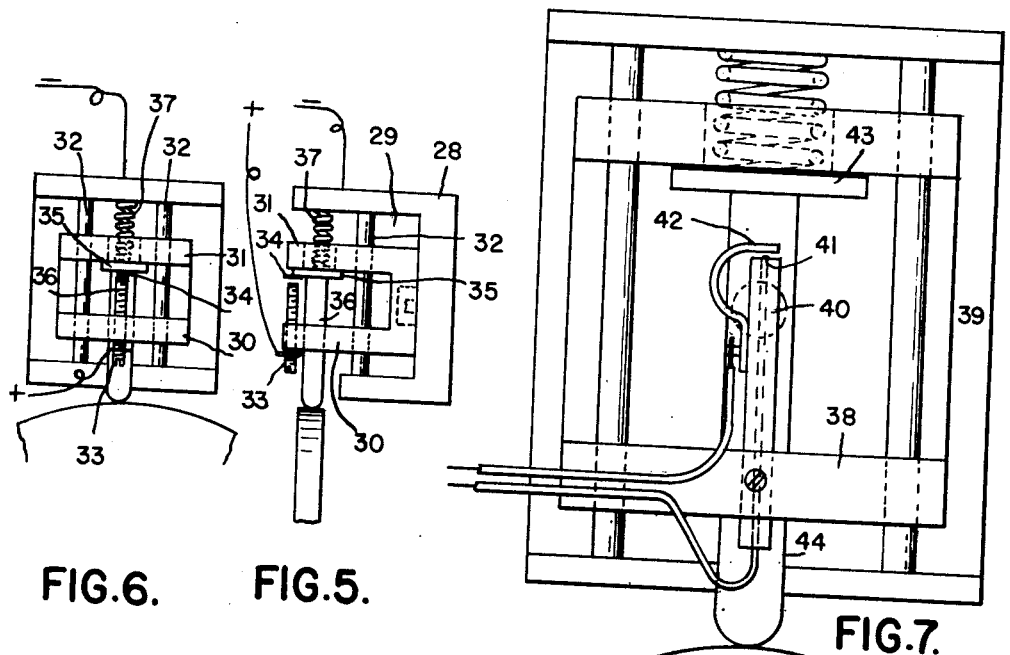
FIG.6.   FIG.5.
FIG.7.
INVENTOR.
ROBERT T. HALL
BY
*Whittemore Hulbert & Belknap*
ATTORNEYS Patented Aug. 24, 1954

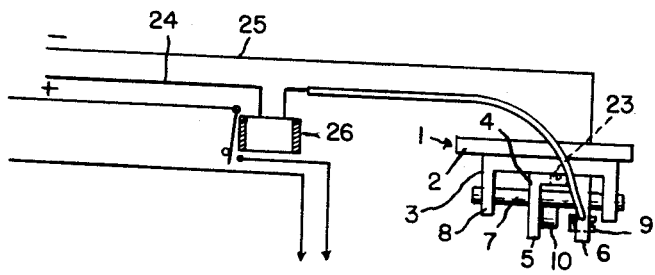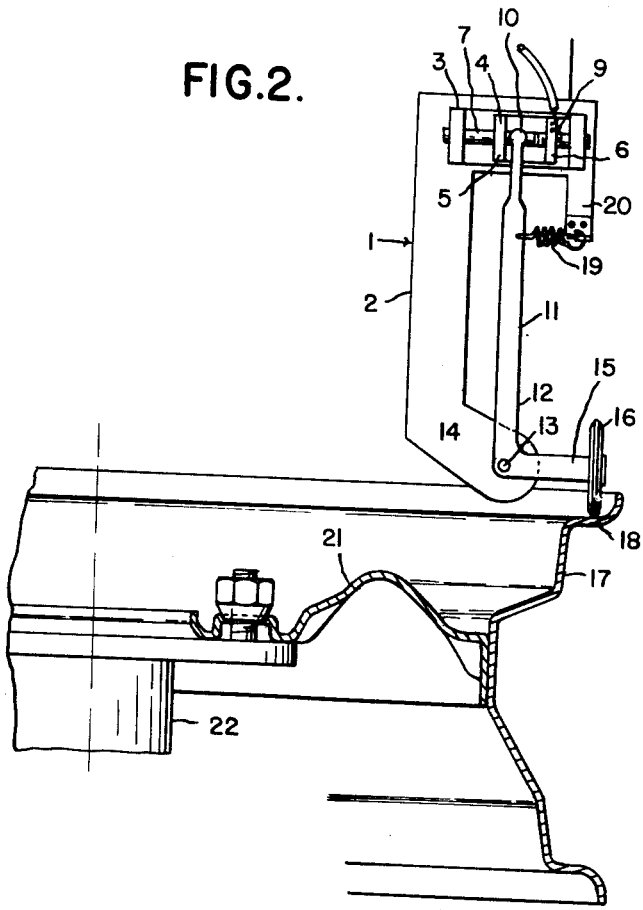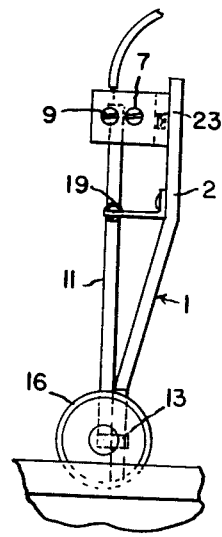

2,687,454

UNITED STATES PATENT OFFICE 2,687,454

ELECTRICAL CHECKING DEVICE

Robert T. Hall, Birmingham, Mich., assignor to Kelsey-Hayes Wheel Company, Detroit, Mich., a corporation of Delaware Application June 19, 1950, Serial No. 168,930

1 Claim. (Cl. 200—61.41)

The invention relates to electrical devices for checking dimensional variations of articles and refers more particularly to electrical devices for checking dimensional variations or run-outs of rotatable articles.

The invention has for one of its objects to provide an improved device for checking dimensional variations of individual articles which device is so constructed that it is efficient in operation and may be economically manufactured.

The invention has for another object to provide a checking device which is automatically operable upon dimensional variation greater than that allowed in commercial practice.

The invention has for a further object to provide a checking device having an electrical contact mounted on a slide which is adapted to be positioned by the article being checked to position the contact so that no electric circuit is made or completed through the contact if the dimensional variation of the article is within commercial limits but an electrical circuit is made through the contact if the dimensional variation is greater.

With these and other objects in view, the invention resides in the novel features of construction and combinations and arrangements of parts as more fully hereinafter set forth:

In the drawings:

Figures 1 and 3 are respectively a top plan and a side elevation of the device;

Figure 2 is a side elevation of the device embodying the invention applied to an article which is shown in section;

Figure 4 is a view similar to Figure 1 showing the device applied to the same article for checking a different dimensional variation;

Figure 5 is a view similar to Figure 1 showing a modified construction of device;

Figure 6 is a front elevation thereof;

Figure 7 is a view similar to Figure 6 showing another modified construction of device.

While the device may be used to check dimensional variations in a large number of articles, such as, disks, hubs, brake drums, rims, blocks, plates and the like, the device as illustrated in Figures 1, 2 and 3 is used to check the lateral dimensional variation or run-out of a rotatable article such as a tire carrying rim.

The device comprises the electrical conducting support 1 formed of the generally L-shaped plate 2 and the channel shaped plate 3 secured to the short arm of the plate 2. The device also comprises the channel shaped slide 4 which is formed of insulating material and has the flanges 5 and 6 provided with apertures for slidably engaging the rod 7 which extends transversely of and is secured to the end flanges 8 of the channel-shaped plate. 9 is an adjustable electrical contact extending transversely of and threadedly engaging the flange 6 of the slide and 10 is a second electrical contact movable between the contact 9 and the flange 5 of the slide. The contact 10 forms part of the arm 11 of the bell crank 12 which is pivotally and electrically connected by the pin 13 to the lateral projection 14 at the free end of the long arm of the plate 2. The other arm 15 of the bell crank has journalled thereon the roll 16 which is engageable with the tire carrying rim 17 and more particularly the axially outer surface of the tire retaining flange 18 of the rim. For normally urging the bell crank to swing in a clockwise direction and move the contact 10 toward the contact 9 there is the coil spring 19 between the arm 11 of the bell crank and the projection 20 extending transversely of the free end of the short arm of the plate 2.

The rim is mounted on the wheel body or spider 21 which in turn is mounted on and secured to the rotatable spindle 22. The support 1 with the parts carried thereby is movable toward the rim and spider to engage the roll 16 with the tire retaining flange 18 of the rim at which time the arm 11 of the multiplier bell crank, and more particularly, the contact 10 engages the flange 5 of the slide and moves the slide along the rod 7 and the plate 3 to a position dependent upon the highest point of the axially outer surface of the tire retaining flange engaged by the roll. The contact 9 is adjusted so that its contact face is spaced from the opposed face of the flange 6 a predetermined distance such that during the rotation of the rim, the contact 10 will not engage the contact 9 if the lateral run-out of the rim is within commercial limits but the two contacts will be engaged if the lateral run-out is greater.

For the purpose of holding the slide 4 in the position to which it is adjusted by the bell crank 12, I have provided the device 23 which in the present instance is a permanent magnet mounted in the base of the slide 4 and slidable over the base of the plate 3.

The contact 9 and support 1 are connected to a suitable source of electric power by the lines 24 and 25 respectively, the line 24 having the relay 26 of the lockdown type which, when the electric circuit is made or completed by reason of the contact 10 engaging the contact 9, controls operation of suitable mechanism such as a light, bell or a reject device (not shown) or a combination thereof.

As illustrated in Figure 4, the device is used to check the radial dimensional variation or run-out of the tire carrying rim and more particularly one of the tire bead seats 27 of the rim during its rotation. It will be noted that the construction of the device is the same as that of Figures 1, 2 and 3 but it is mounted at right angles so that it is quite important to provide means such as the permanent magnet for holding the slide in the position to which it is adjusted by the multiplier bell crank since the slide might otherwise drop to its inoperative position.

In operation when either device is brought into operative relation to the article to be checked, and more particularly the tire carrying rim, the roll of the device engages the article and through the multiplier bell crank automatically adjusts the slide relative to the support to a position determined by the highest point of the surface of the article upon its rotation since the adjustable electrical contact is set to allow a predetermined variation in distance from the highest point to the lowest point of the surface of the article being checked. The device will make or complete the electric signaling circuit if the dimensional variation or run-out is in excess. However, if the variation is within the commercial limits allowed the device will not operate to make or close the electric circuit.

The device illustrated in Figures 5 and 6 differs essentially from the device of Figures 1, 2 and 3 in having a direct acting plunger for making and breaking the electric circuit. More particularly the device comprises the electrical conducting channel-shaped plate 28 forming the support, the insulator channel-shaped slide 29 having its base slidable over the base of the plate and its flanges 30 and 31 slidable over the rods 32 which extend between and are mounted on the end flanges of the plate. 33 is the adjustable electrical contact extending transversely of and threadedly engaging the flange 30, and 34 is the cooperating contact mounted on and forming part of the head 35 of the plunger 36 which slidably extends through the flange 30 and has a rounded end engageable with the surface of the work to be checked. 37 is a coil spring extending through a hole in the flange 31 of the slide and abutting the head 35 and the adjacent end flange of the plate 28 and forming an electrical connection between the end flange and the head. The end flange and the adjustable electrical contact are connected by suitable electric lines to the source of power and the signaling mechanism.

The device illustrated in Figure 7 is in general the same as that illustrated in Figures 5 and 6 with the exception that both electrical contacts are carried by the slide. In detail, the flange 38 of the channel-shaped slide 39 adjustably carries the transversely extending tube 40 which is preferably formed of insulating material. This tube carries the electrical contact 41 and also the electrical contact 42 which latter extends over and is normally spaced above the contact 41 and is in position to be engaged by the head 43 of the work engaging plunger 44. The electrical contacts are directly connected to the source of electrical power by electric lines including the signaling mechanism. The tube 40 is adjustably mounted.

In operation, it will be seen that in the devices of Figures 5 and 6 and Figure 7, the plungers automatically adjust the slides to predetermined positions relative to their supports dependent upon the highest points of the surfaces of the articles being checked and control the making or closing of the electric circuits in the event that the lowest points of the surfaces of the articles being checked are spaced in excess of the predetermined amount.

It will be noted that all of the above devices are operative to check dimensional variations of individual articles without particular reference to each other since the slides are adjustable through a considerable range. Therefore, the articles being checked need not have the same basic dimensions.

What I claim as my invention is:

An electrical device for checking dimensional variation of an article comprising an electrical conducting support, a channel shaped insulator slide mounted on said support and movable relative thereto transversely of the flanges of said slide, an electrical contact adjustably mounted on one of the flanges of said slide, an electrical conducting member movably mounted on and electrically connected to said support and having a part movable between and engageable with said contact and the other flange of said slide and a part engageable with the article, said member upon engagement with said other flange being adapted to adjust said slide relative to said support, and magnetic means for normally holding said slide in adjusted position.

References Cited in the file of this patent

UNITED STATES PATENTS

| Number | Name | Date |
|---|---|---|
| 847,981 | Brown | Mar. 19, 1907 |
| 2,179,517 | Pelosi | Nov. 14, 1939 |

FOREIGN PATENTS

| Number | Country | Date |
|---|---|---|
| 691,368 | France | Jan. 30, 1930 |